US012498657B2

(12) United States Patent
Takiguchi

(10) Patent No.: US 12,498,657 B2
(45) Date of Patent: Dec. 16, 2025

(54) IMAGE FORMING APPARATUS AND PREDICTION METHOD CAPABLE OF IMPROVING PREDICTION ACCURACY OF EXECUTION TIME OF HEATING PROCESS OF HEATING FIXING MEMBER

(71) Applicant: KYOCERA Document Solutions Inc., Osaka (JP)

(72) Inventor: Fumiaki Takiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 4 days.

(21) Appl. No.: 18/660,552

(22) Filed: May 10, 2024

(65) Prior Publication Data

US 2024/0385555 A1 Nov. 21, 2024

(30) Foreign Application Priority Data

May 16, 2023 (JP) ................................ 2023-080498

(51) Int. Cl.
*G03G 15/20* (2006.01)
*G03G 15/00* (2006.01)

(52) U.S. Cl.
CPC ....... *G03G 15/205* (2013.01); *G03G 15/5004* (2013.01)

(58) Field of Classification Search
CPC ............ G03G 15/205; G03G 15/5004; G03G 15/5012; G03G 15/55; G03G 15/80; G03G 2215/00978
USPC ............................................... 399/37, 70, 88
See application file for complete search history.

(56) References Cited

U.S. PATENT DOCUMENTS

| | | | | |
|---|---|---|---|---|
| 9,639,038 | B1 * | 5/2017 | Cao | G03G 15/2039 |
| 9,709,936 | B1 * | 7/2017 | Ball | G06F 1/305 |
| 2006/0251440 | A1 * | 11/2006 | Tatematsu | G03G 15/205 399/69 |
| 2009/0003867 | A1 * | 1/2009 | Fujimoto | G03G 15/2039 399/69 |
| 2010/0046978 | A1 * | 2/2010 | Suzuki | G03G 15/80 399/88 |
| 2013/0322907 | A1 * | 12/2013 | Namiki | G03G 13/20 399/69 |

FOREIGN PATENT DOCUMENTS

JP 2016009077 A 1/2016

* cited by examiner

*Primary Examiner* — Robert B Beatty
(74) *Attorney, Agent, or Firm* — Alleman Hall & Tuttle LLP

(57) ABSTRACT

An image forming apparatus includes a heater, a preparation processing portion, an acquisition processing portion, and a prediction processing portion. The heater heats a fixing member used to fix a toner image in response to supply of an AC voltage from a commercial power supply. The preparation processing portion executes a heating process of heating the fixing member to a predetermined target temperature using the heater when the image forming apparatus transitions from a first state in which image formation is impossible to a second state in which image formation is possible. The acquisition processing portion acquires a voltage value of the AC voltage supplied from the commercial power supply. The prediction processing portion predicts an execution time of the heating process based on the voltage value of the AC voltage acquired by the acquisition processing portion.

5 Claims, 6 Drawing Sheets

IMAGE FORMING APPARATUS AND PREDICTION METHOD CAPABLE OF IMPROVING PREDICTION ACCURACY OF EXECUTION TIME OF HEATING PROCESS OF HEATING FIXING MEMBER

INCORPORATION BY REFERENCE

This application is based upon and claims the benefit of priority from the corresponding Japanese Patent Application No. 2023-080498 filed on May 16, 2023, the entire contents of which are incorporated herein by reference.

BACKGROUND

The present disclosure relates to an image forming apparatus and a prediction method executed by the image forming apparatus.

In an electrophotographic image forming apparatus, a plurality of preparation processes are executed in parallel when the apparatus transitions from a state in which image formation is impossible to a state in which image formation is possible. For example, the plurality of preparation processes include a heating process of heating a fixing member, such as a fixing roller, until the temperature of the fixing member reaches a predetermined target temperature, and an acceleration process of accelerating a polygon mirror until the rotational speed of the polygon mirror reaches a predetermined target speed.

Further, in order to suppress wasteful power consumption, an image forming apparatus that controls the start timing of each of the preparation processes based on a predicted value of the execution time of the preparation process so that the end timings of the preparation processes coincide with each other is known as related art.

SUMMARY

An image forming apparatus according to one aspect of the present disclosure includes a heater, a preparation processing portion, an acquisition processing portion, and a prediction processing portion. The heater heats a fixing member used to fix a toner image in response to supply of an AC voltage from a commercial power supply. The preparation processing portion executes a heating process of heating the fixing member to a predetermined target temperature using the heater when the image forming apparatus transitions from a first state in which image formation is impossible to a second state in which image formation is possible. The acquisition processing portion acquires a voltage value of the AC voltage supplied from the commercial power supply. The prediction processing portion predicts an execution time of the heating process based on the voltage value of the AC voltage acquired by the acquisition processing portion.

A prediction method according to another aspect of the present disclosure is executed by an image forming apparatus including a heater configured to heat a fixing member used to fix a toner image in response to supply of an AC voltage from a commercial power supply, and includes a preparation step, an acquisition step, and a prediction step. In the preparation step, a heating process of heating the fixing member to a predetermined target temperature using the heater is executed when the image forming apparatus transitions from a first state in which image formation is impossible to a second state in which image formation is possible. In the acquisition step, a voltage value of the AC voltage supplied from the commercial power supply is acquired. In the prediction step, an execution time of the heating process is predicted based on the voltage value of the AC voltage acquired by the acquisition step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. It is noted that the following embodiment is an example of embodying the present disclosure and does not limit the technical scope of the present disclosure.

[Configuration of Image Forming Apparatus 100]

Figure 1:
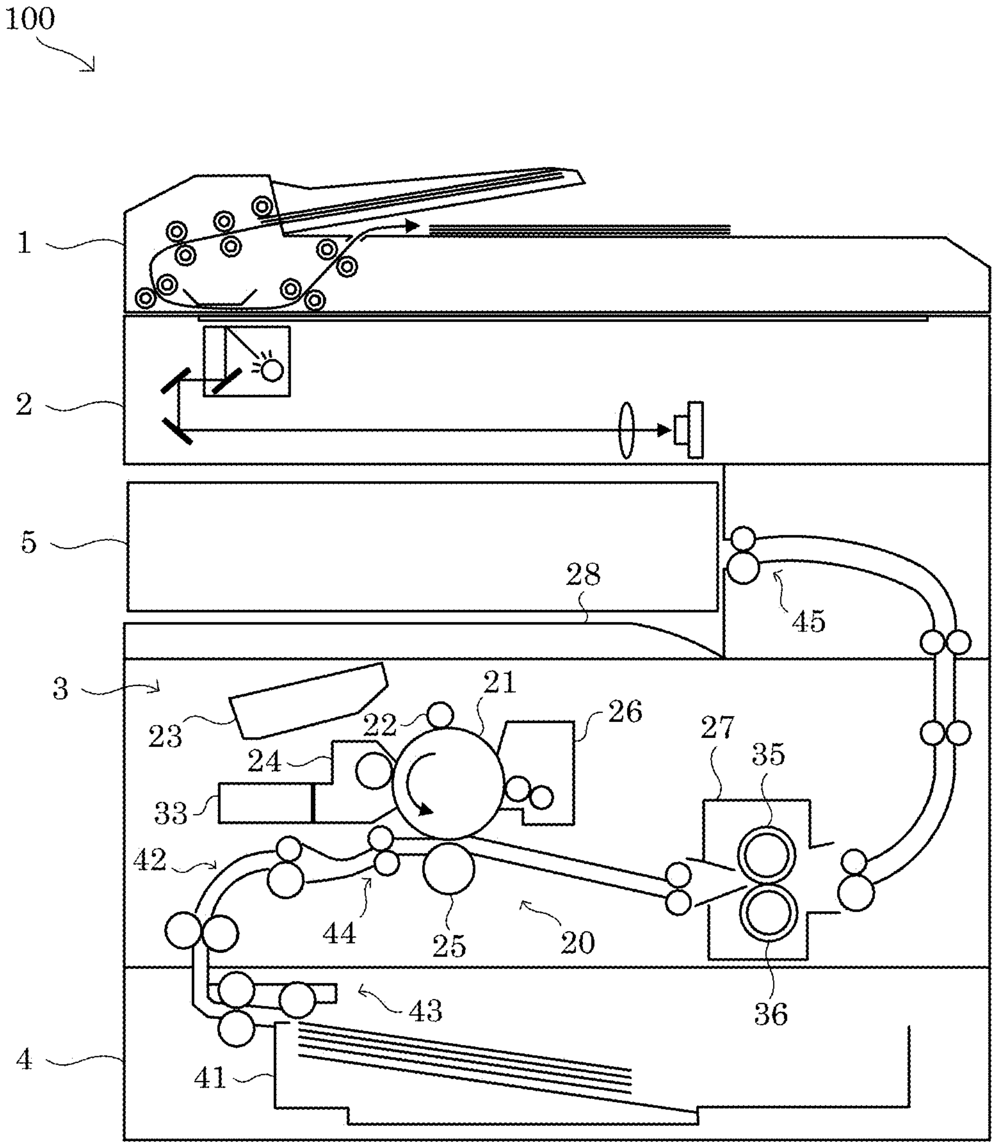
FIG. 1 shows a configuration of an image forming apparatus according to an embodiment of the present disclosure.

First, a configuration of an image forming apparatus 100 according to an embodiment of the present disclosure will be described with reference to FIG. 1 and FIG. 2. Here, FIG. 1 is a cross-sectional view showing a configuration of the image forming apparatus 100. It is noted that the image forming apparatus 100 is indicated by a dashed line in FIG. 2.

The image forming apparatus 100 has a print function for forming an image on a sheet using an electrophotographic method. Specifically, the image forming apparatus 100 is a multifunction peripheral having a plurality of functions including the print function. It is noted that the image forming apparatus 100 may be a printer, a facsimile machine, a copier, or the like which has the print function.

Figure 2:
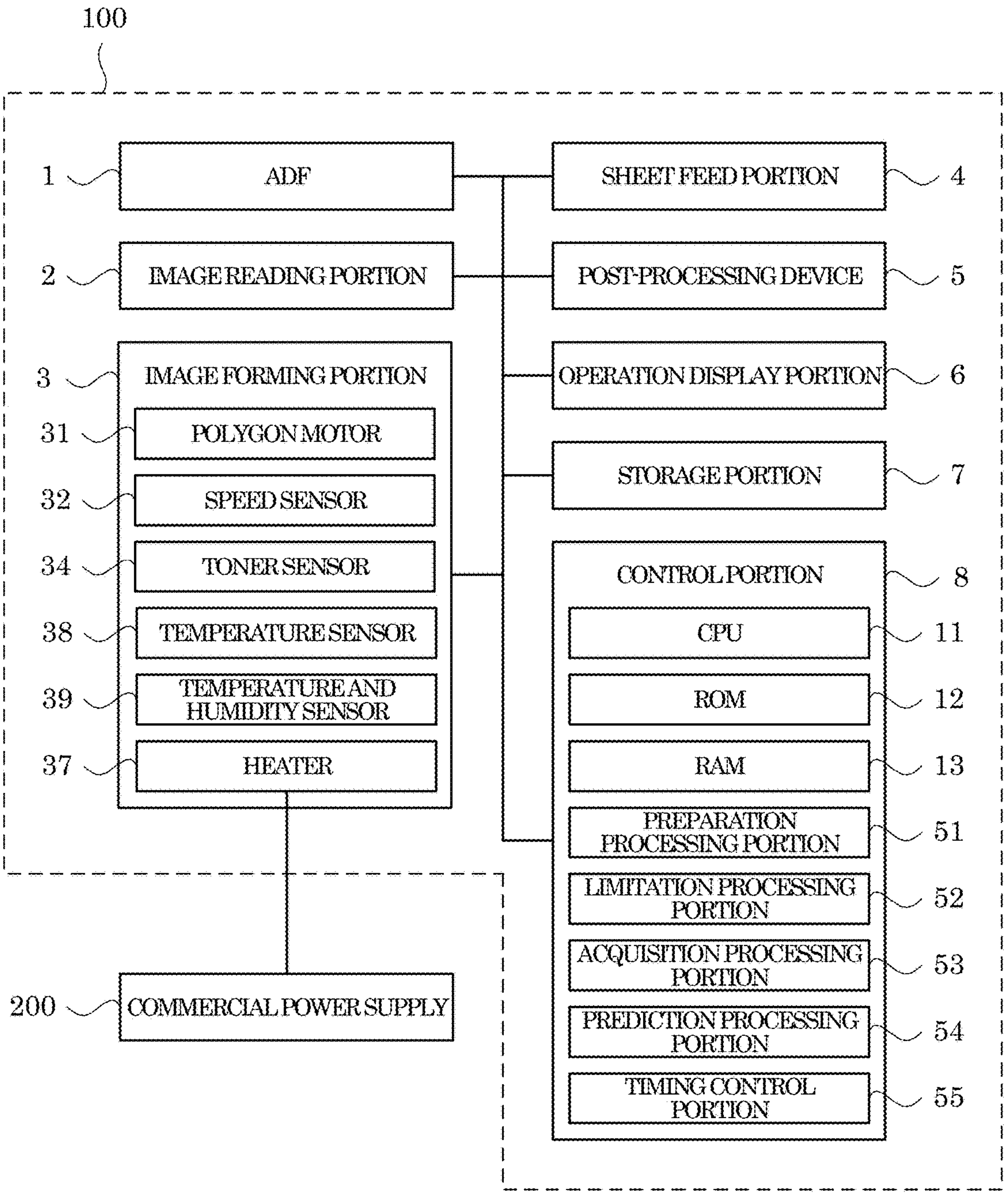
FIG. 2 is a block diagram showing a system configuration of the image forming apparatus according to the embodiment of the present disclosure.

As shown in FIG. 1 and FIG. 2, the image forming apparatus 100 includes an auto document feeder (ADF) 1, an image reading portion 2, an image forming portion 3, a sheet feed portion 4, a post-processing device 5, an operation display portion 6, a storage portion 7, and a control portion 8.

The ADF 1 conveys a document sheet whose image is read by the image reading portion 2. The ADF 1 includes a document sheet loading portion, a plurality of conveying rollers, a document sheet holder, and a sheet discharge portion.

The image reading portion 2 implements a scan function for reading an image from a document sheet. The image reading portion 2 includes a document sheet table, a light source, a plurality of mirrors, an optical lens, and a charge coupled device (CCD). The image reading portion 2 reads an image from a document sheet conveyed by the ADF 1 and outputs image data representing the read image. In addition, the image reading portion 2 reads an image from a document sheet placed on the document sheet table and outputs image data representing the read image.

The image forming portion 3 implements the print function.

The sheet feed portion 4 supplies a sheet to the image forming portion 3.

The post-processing device 5 executes predetermined post-processing on a sheet on which an image has been formed by the image forming portion 3. For example, the post-processing includes a stapling process of binding a bundle of sheets using a staple. The post-processing device 5 is retrofitted to a sheet discharge tray 28 of the image forming portion 3 (see FIG. 1). The post-processing device 5 is a type of post-processing device called an inner type. It is noted that the post-processing device 5 may be a so-called floor type or saddle type post-processing device provided adjacent to the image forming apparatus 100 on the installation surface on which the image forming apparatus 100 is installed. The post-processing device 5 is an example of the optional device of the present disclosure. It is noted that the optional device of the present disclosure may be a sheet feed device or the like which is retrofitted to the image forming apparatus 100.

The operation display portion 6 is a user interface of the image forming apparatus 100. The operation display portion 6 includes a display portion and an operation portion. The display portion displays various types of information in response to control instructions from the control portion 8. For example, the display portion is a display device such as a liquid crystal display. The operation portion inputs various types of information to the control portion 8 in response to user operations. For example, the operation portion is an operation device such as a touch panel.

The storage portion 7 is a nonvolatile storage device. For example, the storage portion 7 is a nonvolatile memory such as a flash memory.

The control portion 8 performs overall control of the image forming apparatus 100. As shown in FIG. 2, the control portion 8 includes a CPU 11, a ROM 12, and a RAM 13. The CPU 11 is a processor that executes various arithmetic processes. The ROM 12 is a nonvolatile storage device in which information such as control programs for causing the CPU 11 to execute various processes are stored in advance. The RAM 13 is a volatile or nonvolatile storage device used as a temporary storage memory (work area) for various processes executed by the CPU 11. In the control portion 8, various control programs stored in the ROM 12 in advance are executed by the CPU 11. The control portion 8 thereby performs overall control of the image forming apparatus 100. It is noted that the control portion 8 may be composed of an electronic circuit such as an integrated circuit (ASIC). In addition, the control portion 8 may be a control portion provided separately from a main control portion that performs overall control of the image forming apparatus 100.

[Configurations of Image Forming Portion 3 and Sheet Feed Portion 4]

Next, configurations of the image forming portion 3 and the sheet feed portion 4 will be described with reference to FIG. 1 to FIG. 2.

As shown in FIG. 1, the image forming portion 3 includes a photoconductor drum 21, a charging device 22, a laser scanning unit 23, a developing device 24, a transfer roller 25, a cleaning device 26, a fixing device 27, and the sheet discharge tray 28. In addition, the image forming portion 3 includes a temperature and humidity sensor 39 shown in FIG. 2.

The photoconductor drum 21 is rotatably supported by the housing of the image forming apparatus 100. The photoconductor drum 21 rotates in the direction of the arrow shown in FIG. 1 under rotational drive power transmitted from a motor (not shown).

The charging device 22 charges the surface of the photoconductor drum 21.

The laser scanning unit 23 applies light based on image data to the surface of the photoconductor drum 21 charged by the charging device 22. The laser scanning unit 23 forms an electrostatic latent image on the surface of the photoconductor drum 21.

The laser scanning unit 23 includes a polygon mirror (not shown). The laser scanning unit 23 includes a polygon motor 31 and a speed sensor 32 shown in FIG. 2. The polygon mirror is rotatably provided inside the laser scanning unit 23. The polygon motor 31 rotates the polygon mirror. The speed sensor 32 detects the rotational speed of the polygon mirror. The speed sensor 32 is used for drive control of the polygon motor 31 by the control portion 8.

The developing device 24 develops the electrostatic latent image formed on the surface of the photoconductor drum 21 using a developer including toner. A toner image is formed on the surface of the photoconductor drum 21 by the developing device 24. As shown in FIG. 1, the developing device 24 is connected to a toner container 33. The toner container 33 contains toner to be supplied to the developing device 24.

The developing device 24 includes a toner sensor 34 shown in FIG. 2. The toner sensor 34 detects the amount of toner contained in the developing device 24. The toner sensor 34 is used for control of the supply of toner from the toner container 33 to the developing device 24 by the control portion 8.

The transfer roller 25 transfers the toner image formed on the surface of the photoconductor drum 21 to a sheet conveyed by the sheet feed portion 4.

The cleaning device 26 cleans the surface of the photoconductor drum 21 after the toner image has been transferred by the transfer roller 25.

The photoconductor drum 21, the charging device 22, the laser scanning unit 23, the developing device 24, the transfer roller 25, and the cleaning device 26 constitute an image forming unit 20 (see FIG. 1) that forms a toner image.

The fixing device 27 heats the toner image transferred to the sheet to fix the toner image to the sheet. As shown in FIG. 1, the fixing device 27 includes a fixing roller 35 and a pressure roller 36. The fixing roller 35 and the pressure roller 36 form a fixing nip portion that nips and conveys the sheet to which the toner image has been transferred.

The fixing device 27 includes a heater 37 and a temperature sensor 38 shown in FIG. 2. The heater 37 heats the fixing roller 35 (an example of the fixing member of the present disclosure) used to fix the toner image in response to supply of an AC voltage from a commercial power supply 200 (see FIG. 2). The temperature sensor 38 detects the temperature of the fixing roller 35. The temperature sensor 38 is used for drive control of the heater 37 by the control portion 8.

The post-processing device 5 is attached to the sheet discharge tray 28. It is noted that a sheet to which the toner image has been fixed by the fixing device 27 is discharged to the sheet discharge tray 28 when the post-processing device 5 is not attached.

The temperature and humidity sensor 39 detects the temperature and humidity inside the housing of the image forming apparatus 100.

As shown in FIG. 1, the sheet feed portion 4 includes a sheet feed cassette 41, a sheet conveying path 42, a sheet feed unit 43, a registration roller pair 44, and a sheet discharge roller pair 45.

The sheet feed cassette 41 accommodates sheets on which images are formed by the image forming portion 3. For example, the sheet feed cassette 41 accommodates sheet members such as paper, coated paper, postcards, envelopes, and OHP sheets. The sheet feed cassette 41 has a lift plate that lifts up a plurality of sheets accommodated therein.

The sheet conveying path 42 is a path for moving sheets from the sheet feed cassette 41 to the sheet discharge tray 28 via the transfer roller 25 and the fixing device 27. The sheet conveying path 42 is provided with a plurality of roller pairs including the registration roller pair 44 and the sheet discharge roller pair 45. On the sheet conveying path 42, a sheet carried out from the sheet feed cassette 41 is conveyed by the plurality of roller pairs toward the sheet discharge tray 28. The sheet conveying path 42 is formed by a pair of conveyance guide members provided inside the housing of the image forming apparatus 100.

The sheet feed unit 43 feeds sheets accommodated in the sheet feed cassette 41 one by one to the sheet conveying path 42. The sheet feed unit 43 includes a pickup roller, a sheet feed roller, and a retard roller. The pickup roller rotates in contact with the upper surface of the uppermost sheet of the sheets lifted by the lift plate of the sheet feed cassette 41, thereby feeding the sheet to the sheet feed roller. The sheet feed roller rotates in contact with the upper surface of the sheet fed by the pickup roller, thereby feeding the sheet to the sheet conveying path 42. The retard roller is biased from below the sheet feed roller toward the sheet feed roller. When a plurality of overlapping sheets are fed by the pickup roller, the retard roller separates the sheets other than the uppermost layer from the overlapping sheets.

In synchronization with the timing at which the toner image formed on the surface of the photoconductor drum 21 is conveyed by the rotation of the photoconductor drum 21 to a transfer position where the toner image is transferred by the transfer roller 25, the registration roller pair 44 conveys the sheet to the transfer position.

The sheet discharge roller pair 45 supplies the sheet to which the toner image has been fixed by the fixing device 27 to the post-processing device 5 or discharges the sheet to the sheet discharge tray 28.

In the image forming apparatus 100, a plurality of preparation processes are executed in parallel when the operation state of the image forming apparatus 100 transitions from a first state in which image formation is impossible to a second state in which image formation is possible. When all of the plurality of preparation processes are completed, the operating state of the image forming apparatus 100 transitions to the second state.

For example, the plurality of preparation processes include a heating process, an image forming unit activation process (an example of the second activation process of the present disclosure), a post-processing device activation process (an example of the first activation process of the present disclosure), and a calibration process (an example of the adjustment process of the present disclosure).

The heating process is a process of heating the fixing roller 35 to a predetermined target temperature using the heater 37.

The image forming unit activation process is a process of activating the image forming unit 20 (see FIG. 1). Specifically, the image forming unit activation process includes an acceleration process. The acceleration process is a process of accelerating the polygon mirror until the rotational speed of the polygon mirror reaches a predetermined target speed. It is noted that the image forming unit activation process may include a toner supply process of supplying the toner in the toner container 33 to the developing device 24 until the amount of toner contained in the developing device 24 reaches a predetermined reference amount. In addition, the image forming unit activation process may include a developer stirring process of stirring the developer contained in the developing device 24 for a predetermined time.

The post-processing device activation process is a process of activating the post-processing device 5. The post-processing device activation process is executed when the post-processing device 5 is attached to the image forming apparatus 100.

The calibration process is a process of adjusting the operation condition of the image forming unit 20 (see FIG. 1). The calibration process is executed after the image forming unit activation process. For example, in the calibration process, the operation condition of the image forming unit 20, such as the developing bias voltage applied to the developing roller included in the developing device 24, is adjusted based on the toner density of a predetermined test toner image formed on the photoconductor drum 21. In the image forming apparatus 100, when the calibration process is executed, the image forming unit activation process and the calibration process which are executed successively are treated as one preparation process.

It is noted that the plurality of preparation processes may include a primary sheet feeding process of conveying a sheet accommodated in the sheet feed cassette 41 to the registration roller pair 44.

By the way, in order to suppress wasteful power consumption, an image forming apparatus that controls the start timing of each of the preparation processes based on a predicted value of the execution time of the preparation process so that the end timings of the preparation processes coincide with each other is known as related art.

However, in the image forming apparatus according to the above-mentioned related art, the fluctuation of the power supplied to the heater 37 is not taken into consideration, and the execution time of the heating process cannot be accurately predicted.

In contrast, the image forming apparatus 100 according to the embodiment of the present disclosure can improve the prediction accuracy of the execution time of the heating process as will be described below.

[Configuration of Control Portion 8]

The configuration of the control portion 8 will be described in more detail below with reference to FIG. 2.

As shown in FIG. 2, the control portion 8 includes a preparation processing portion 51, a limitation processing portion 52, an acquisition processing portion 53, a prediction processing portion 54, and a timing control portion 55.

Specifically, the ROM 12 of the control portion 8 stores in advance state transition programs for causing the CPU 11 to function as the respective portions described above. By executing the state transition programs stored in the ROM 12, the CPU 11 functions as the respective portions described above.

It is noted that the state transition programs may be recorded on a computer-readable recording medium such as a CD, a DVD, or a flash memory, and may be read from the recording medium and stored in a storage device such as the storage portion 7. In addition, some or all of the above-mentioned functional portions may be composed of an electronic circuit such as an integrated circuit (ASIC). In addition, the state transition programs may be programs for causing a plurality of processors to function as the functional portions included in the control portion 8.

When the image forming apparatus 100 transitions from the first state to the second state, the preparation processing portion 51 executes the plurality of preparation processes including the heating process.

Specifically, when the image forming apparatus 100 transitions from the first state to the second state, the preparation processing portion 51 executes the heating process and the image forming unit activation process.

In addition, when the image forming apparatus 100 transitions from the first state to the second state and the post-processing device 5 is attached to the image forming apparatus 100, the preparation processing portion 51 executes the post-processing device activation process.

In addition, when the image forming apparatus 100 transitions from the first state to the second state and satisfies a predetermined adjustment condition, the preparation processing portion 51 executes the calibration process. For example, the adjustment condition is that the elapsed time from the execution of the immediately preceding calibration process exceeds a predetermined time. It is noted that the adjustment condition may be that the number of sheets on which images have been formed since the execution of the immediately preceding calibration process exceeds a predetermined number. In addition, the preparation processing portion 51 may unconditionally execute the calibration process when the image forming apparatus 100 transitions from the first state to the second state.

During execution of the post-processing device activation process, the limitation processing portion 52 limits the power supplied to the heater 37 in accordance with the power consumption of the post-processing device activation process.

For example, in the image forming apparatus 100, on a power supply path between the commercial power supply 200 (see FIG. 1) and the heater 37, a switching element (not shown) capable of switching between conduction and interruption of the power supply path is provided. In addition, in the image forming apparatus 100, first table data in which the power consumption of the post-processing device activation process and the limiting amount of the power supplied to the heater 37 are associated with each other is stored in the storage portion 7 in advance. In the first table data, the correspondence relationship between the power consumption of the post-processing device activation process and the limiting amount of the power supplied to the heater 37 is defined so that the greater the power consumption of the post-processing device activation process, the greater the limiting amount of the power supplied to the heater 37.

The limitation processing portion 52 acquires the power consumption of the post-processing device activation process when the post-processing device activation process is executed. For example, the limitation processing portion 52 acquires the power consumption of the post-processing device activation process from a storage device included in the post-processing device 5 that stores information on the post-processing device 5. In addition, the limitation processing portion 52 uses the first table data to acquire a limiting amount of the power supplied to the heater 37 corresponding to the acquired power consumption of the post-processing device activation process. Then, the limitation processing portion 52 inputs a PWM signal having a duty ratio corresponding to the acquired limiting amount of the power supplied to the heater 37 to the switching element, thereby limiting the power supplied to the heater 37. Thus, when the post-processing device activation process and the heating process are executed at the same time, the power supplied from the commercial power supply 200 to the image forming apparatus 100 can be prevented from exceeding a predetermined rating.

The acquisition processing portion 53 acquires a voltage value of the AC voltage supplied from the commercial power supply 200.

For example, the acquisition processing portion 53 uses a voltmeter (not shown) capable of measuring the voltage value of the AC voltage supplied from the commercial power supply 200 to acquire the voltage value of the AC voltage.

The prediction processing portion 54 predicts the execution time of each of the preparation processes.

Specifically, when the post-processing device 5 is not attached to the image forming apparatus 100, the prediction processing portion 54 predicts the execution time of the heating process based on the voltage value of the AC voltage acquired by the acquisition processing portion 53.

When the post-processing device 5 is attached to the image forming apparatus 100, the prediction processing portion 54 predicts the execution time of the heating process based on the voltage value of the AC voltage acquired by the acquisition processing portion 53 and the power supplied to the heater 37 limited by the limitation processing portion 52.

For example, the prediction processing portion 54 predicts the execution time of the heating process based on a predetermined first reference time and the current execution condition of the heating process. Here, the first reference time is a measured value of the execution time of the heating process when the heating process is executed under a predetermined reference execution condition. The first reference time is stored in the storage portion 7 in advance. The execution condition of the heating process includes conditions relating to the initial temperature (temperature before heating starts) of the fixing roller 35, conditions relating to the temperature and humidity inside the housing of the image forming apparatus 100, conditions relating to the voltage value of the AC voltage supplied from the commercial power supply 200, and conditions relating to the limiting amount of the power supplied to the heater 37 by the limitation processing portion 52.

For example, the prediction processing portion 54 obtains a predicted value of the execution time of the heating process by the following procedure.

First, the prediction processing portion 54 reads the first reference time from the storage portion 7.

Next, the prediction processing portion 54 corrects the read first reference time based on the current execution condition of the heating process. Specifically, the prediction processing portion 54 corrects the first reference time based on the current temperature of the fixing roller 35, the current temperature and humidity inside the housing of the image forming apparatus 100, the current voltage value of the AC voltage supplied from the commercial power supply 200, and the limiting amount of the power supplied to the heater 37 by the limitation processing portion 52.

For example, in the image forming apparatus 100, second table data in which the current temperature of the fixing roller 35 and the correction value of the first reference time are associated with each other is stored in the storage portion 7 in advance. In the second table data, the correspondence relationship between the current temperature of the fixing roller 35 and the correction value of the first reference time is defined so that the greater the difference between the current temperature of the fixing roller 35 and the initial temperature of the fixing roller 35 under the reference execution condition, the greater the absolute value of the correction value of the first reference time. The prediction processing portion 54 uses the second table data to acquire a correction value of the first reference time corresponding to the current temperature of the fixing roller 35. Then, the prediction processing portion 54 adds the acquired correction value to the first reference time to correct the first reference time. It is noted that the current temperature of the fixing roller 35 is acquired using the temperature sensor 38.

In addition, in the image forming apparatus 100, third table data in which the current temperature and humidity inside the housing of the image forming apparatus 100 and the correction value of the first reference time are associated with each other is stored in the storage portion 7 in advance. In the third table data, the correspondence relationship between the current temperature and humidity inside the housing of the image forming apparatus 100 and the correction value of the first reference time is defined so that the greater the difference between the current temperature and humidity inside the housing of the image forming apparatus 100 and the temperature and humidity inside the housing of the image forming apparatus 100 under the reference execution condition, the greater the absolute value of the correction value of the first reference time. The prediction processing portion 54 uses the third table data to acquire a correction value of the first reference time corresponding to the current temperature and humidity inside the housing of the image forming apparatus 100. Then, the prediction processing portion 54 adds the acquired correction value to the first reference time to correct the first reference time. It is noted that the current temperature and humidity inside the housing of the image forming apparatus 100 are acquired using the temperature and humidity sensor 39.

In addition, in the image forming apparatus 100, fourth table data in which the current voltage value of the AC voltage supplied from the commercial power supply 200 and the correction value of the first reference time are associated with each other is stored in the storage portion 7 in advance. In the fourth table data, the correspondence relationship between the current voltage value of the AC voltage supplied from the commercial power supply 200 and the correction value of the first reference time is defined so that the greater the difference between the current voltage value of the AC voltage supplied from the commercial power supply 200 and the voltage value of the AC voltage supplied from the commercial power supply 200 under the reference execution condition, the greater the absolute value of the correction value of the first reference time. The prediction processing portion 54 uses the fourth table data to acquire a correction value of the first reference time corresponding to the current voltage value of the AC voltage supplied from the commercial power supply 200. Then, the prediction processing portion 54 adds the acquired correction value to the first reference time to correct the first reference time. It is noted that the current voltage value of the AC voltage supplied from the commercial power supply 200 is acquired by the acquisition processing portion 53.

In addition, in the image forming apparatus 100, fifth table data in which the limiting amount of the power supplied to the heater 37 by the limitation processing portion 52 and the correction value of the first reference time are associated with each other is stored in the storage portion 7 in advance. In the fifth table data, the correspondence relationship between the limiting amount of the power supplied to the heater 37 by the limitation processing portion 52 and the correction value of the first reference time is defined so that the greater the limiting amount of the power supplied to the heater 37 by the limitation processing portion 52, the greater the correction value of the first reference time. It is noted that the limiting amount of the power supplied to the heater 37 by the limitation processing portion 52 under the reference execution condition is zero. The prediction processing portion 54 uses the fifth table data to acquire a correction value of the first reference time corresponding to the limiting amount of the power supplied to the heater 37 by the limitation processing portion 52. Then, the prediction processing portion 54 adds the acquired correction value to the first reference time to correct the first reference time.

Then, the prediction processing portion 54 acquires the first reference time after the correction based on the current execution condition of the heating process as a predicted value of the execution time of the heating process.

The prediction processing portion 54 also obtains a predetermined second reference time as a predicted value of the execution time of the acceleration process. The second reference time is stored in the storage portion 7 in advance. It is noted that the prediction processing portion 54 may correct the second reference time based on the current temperature and humidity inside the housing of the image forming apparatus 100 and acquire the corrected second reference time as a predicted value of the execution time of the acceleration process.

In addition, the prediction processing portion 54 obtains a predetermined third reference time corresponding to the type of the post-processing device 5 as a predicted value of the execution time of the post-processing device activation process. The third reference time is stored in the storage portion 7 in advance.

The prediction processing portion 54 also obtains a predetermined fourth reference time as a predicted value of the execution time of the calibration process. The fourth reference time is stored in the storage portion 7 in advance.

It is noted that the method for predicting the execution time of each of the preparation processes by the prediction processing portion 54 is not limited to the above-described method, and other methods may be used.

The timing control portion 55 controls the start timing of each of the preparation processes executed by the preparation processing portion 51, based on the prediction result by the prediction processing portion 54.

Specifically, the timing control portion 55 determines the start timing of each of the preparation processes so that the end timings of the preparation processes executed by the preparation processing portion 51 coincide with each other when either or both of the post-processing device activation process and the calibration process are not executed. It is noted that the timing control portion 55 may determine the start timing of the heating process so that the end timing of the heating process comes earlier than the end timings of the other preparation processes by a predetermined time. This allows the temperature of the fixing roller 35 to reach the target temperature even if the voltage value of the AC voltage supplied from the commercial power supply 200 suddenly decreases.

In addition, when both of the post-processing device activation process and the calibration process are executed, the timing control portion 55 causes the image forming unit activation process to be executed first, controls the start timing of the post-processing device activation process based on the start timing of the image forming unit activation process, and controls the start timing of the heating process based on the end timing of the calibration process. For example, the timing control portion 55 determines the start timing of the post-processing device activation process so that the start timing of the post-processing device activation process coincides with the start timing of the image forming unit activation process. In addition, the timing control portion 55 determines the start timing of the heating process so that the end timing of the heating process coincides with the end timing of the calibration process.

Here, the prediction processing portion 54 corrects the execution time of the heating process in accordance with the length of a specific execution period in which the post-processing device activation process is not executed in parallel in the execution period of the heating process, which is identified based on the control result by the timing control portion 55. For example, the prediction processing portion 54 calculates a correction value based on the length of the specific execution period, and subtracts the calculated correction value from the predicted value of the execution time of the heating process to correct the execution time of the heating process. For example, the prediction processing portion 54 calculates the correction value by multiplying the length of the specific execution period, the limiting amount of the power supplied to the heater 37 by the limitation processing portion 52, and a predetermined coefficient.

In addition, the timing control portion 55 corrects the start timing of the heating process based on the correction result of the execution time of the heating process by the prediction processing portion 54.

[State Transition Process]

Figure 3:
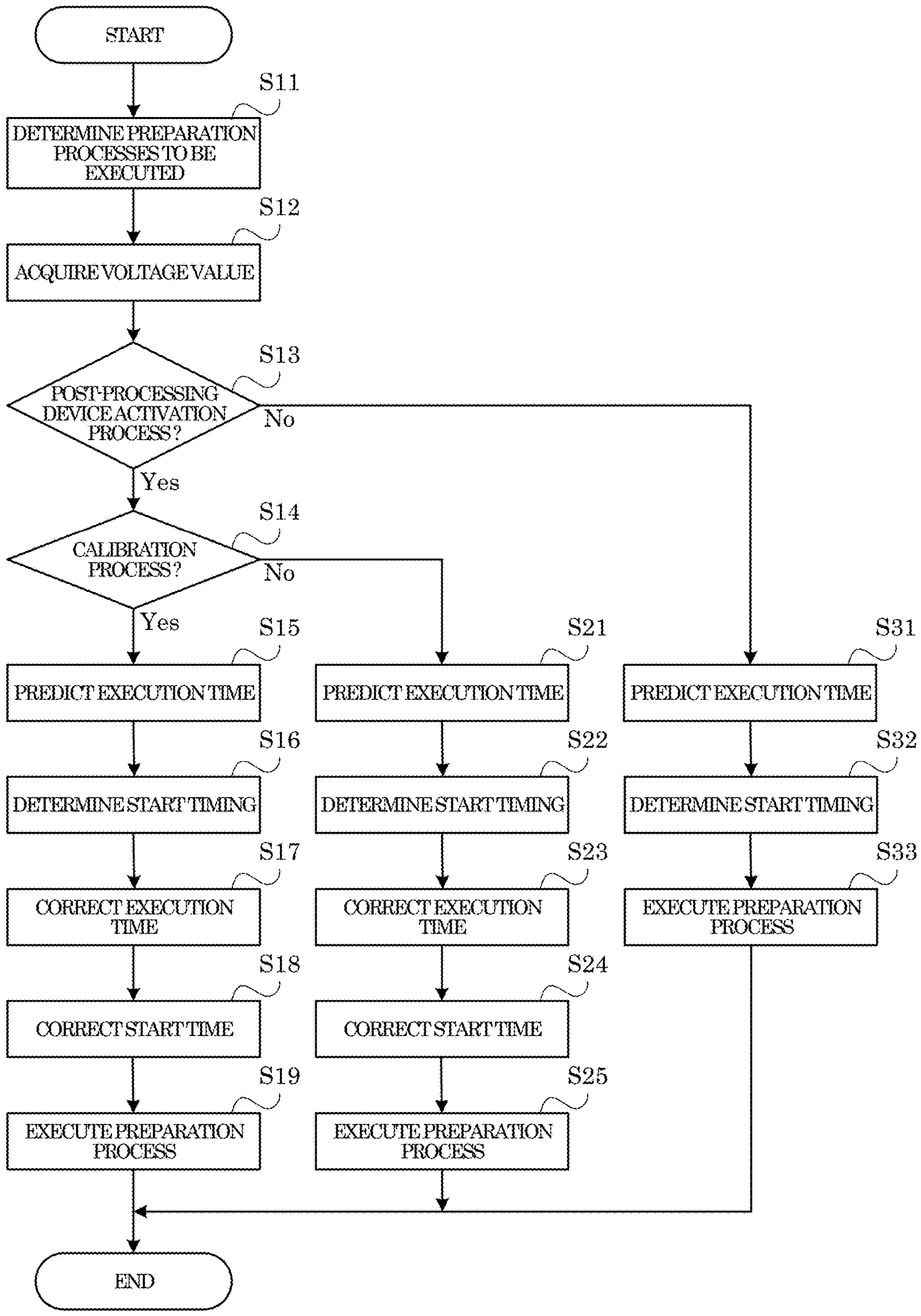
FIG. 3 is a flowchart showing an example of a state transition process executed in the image forming apparatus according to the embodiment of the present disclosure.

The prediction method of the present disclosure will be described below with reference to FIG. 3, along with an example of the procedure of the state transition process executed by the control portion 8 in the image forming apparatus 100. Here, steps S11, S12, . . . represent the numbers of the processing procedure (steps) executed by the control portion 8. It is noted that the state transition process is executed when the operation state of the image forming apparatus 100 transitions from the first state to the second state. For example, in the image forming apparatus 100, when the power of the image forming apparatus 100 is turned on, the operation state transitions from the first state to the second state. In addition, in the image forming apparatus 100, when returning from the sleep mode to the normal mode, the operation state transitions from the first state to the second state.

<Step S11>

In step S11, the control portion 8 determines a plurality of preparation processes to be executed.

Specifically, when the post-processing device 5 is not attached to the image forming apparatus 100 and the adjustment condition is not satisfied, the control portion 8 determines the heating process and the image forming unit activation process as the plurality of preparation processes to be executed.

In addition, when the post-processing device 5 is not attached to the image forming apparatus 100 and the adjustment condition is satisfied, the control portion 8 determines the heating process, the image forming unit activation process, and the calibration process as the plurality of preparation processes to be executed.

In addition, when the post-processing device 5 is attached to the image forming apparatus 100 and the adjustment condition is not satisfied, the control portion 8 determines the heating process, the image forming unit activation process, and the post-processing device activation process as the plurality of preparation processes to be executed.

In addition, when the post-processing device 5 is attached to the image forming apparatus 100 and the adjustment condition is satisfied, the control portion 8 determines the heating process, the image forming unit activation process, the post-processing device activation process, and the calibration process as the plurality of preparation processes to be executed.

<Step S12>

In step S12, the control portion 8 acquires the voltage value of the AC voltage supplied from the commercial power supply 200. Here, the process of step S12 is an example of the acquisition step of the present disclosure, and is executed by the acquisition processing portion 53 of the control portion 8.

<Step S13>

In step S13, the control portion 8 determines whether or not the post-processing device activation process is included in the plurality of preparation processes to be executed.

Here, when the control portion 8 determines that the post-processing device activation process is included in the plurality of preparation processes to be executed (Yes in S13), the control portion 8 shifts the processing to step S14. In addition, when the post-processing device activation process is not included in the plurality of preparation processes to be executed (No in S13), the control portion 8 shifts the processing to step S31.

<Step S31>

In step S31, the control portion 8 predicts the execution time of each of the preparation processes to be executed. Here, the process of step S31 is an example of the prediction step of the present disclosure, and is executed by the prediction processing portion 54 of the control portion 8.

Here, the control portion 8 predicts the execution time of the heating process based on the voltage value of the AC voltage acquired by the process of step S12. Thus, since the execution time of the heating process is predicted in consideration of the fluctuation of the power supplied to the heater 37, the prediction accuracy of the execution time of the heating process can be improved.

<Step S32>

In step S32, the control portion 8 determines the start timing of each of the preparation processes to be executed based on the prediction result of the process of step S31. Here, the process of step S32 is executed by the timing control portion 55 of the control portion 8.

Figure 4:
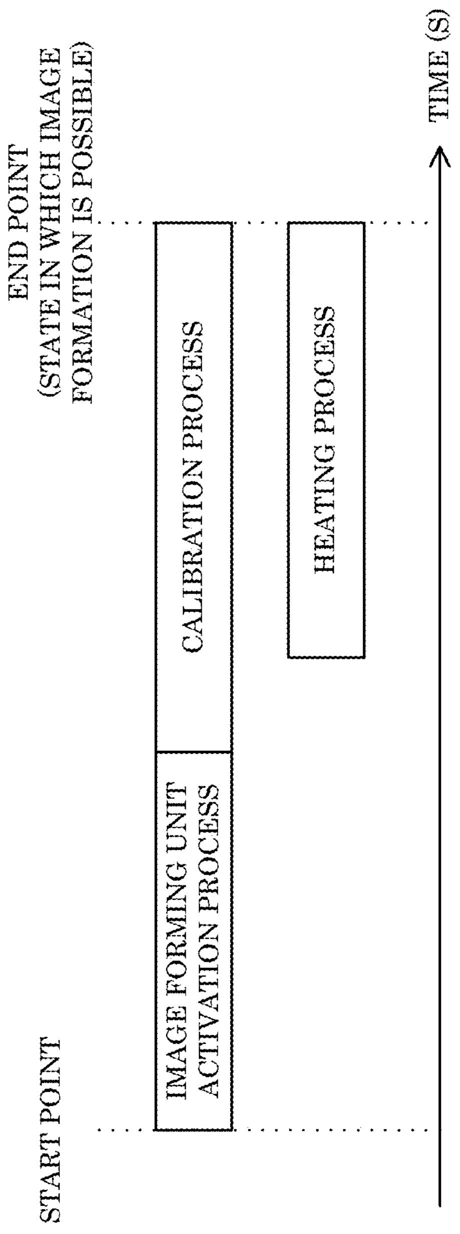
FIG. 4 shows an example of an execution schedule of a plurality of preparation processes executed in the image forming apparatus according to the embodiment of the present disclosure.

Specifically, as shown in FIG. 4, the control portion 8 determines the start timing of each of the preparation processes so that the end timings of the preparation processes coincide with each other. FIG. 4 shows an example of the execution schedule of a plurality of preparation processes when the image forming unit activation process and the calibration process, which are successively executed, and the heating process are executed in the image forming apparatus 100.

<Step S33>

In step S33, the control portion 8 executes each of the preparation processes to be executed in accordance with the start timing of each of the preparation processes determined in the process of step S32. Here, the process of step S33 is an example of the preparation step of the present disclosure, and is executed by the preparation processing portion 51 of the control portion 8.

<Step S14>

In step S14, the control portion 8 determines whether or not the calibration process is included in the plurality of preparation processes to be executed.

Here, when the control portion 8 determines that the calibration process is included in the plurality of preparation processes to be executed (Yes in S14), the control portion 8 shifts the processing to step S15. In addition, when the calibration process is not included in the plurality of preparation processes to be executed (No in S14), the control portion 8 shifts the processing to step S21.

<Step S21>

In step S21, the control portion 8 predicts the execution time of each of the preparation processes to be executed. Here, the process of step S21 is an example of the prediction step of the present disclosure, and is executed by the prediction processing portion 54 of the control portion 8.

Here, the control portion 8 predicts the execution time of the heating process based on the voltage value of the AC voltage acquired by the process of step S12 and the power supplied to the heater 37 limited by the limitation processing portion 52. Accordingly, since the execution time of the heating process is predicted in consideration of the limitation of the power supplied to the heater 37 due to the post-processing device activation process, the prediction accuracy of the execution time of the heating process can be improved.

<Step S22>

In step S22, the control portion 8 determines the start timing of each of the preparation processes to be executed based on the prediction result of the process of step S21. Here, the process of step S22 is executed by the timing control portion 55 of the control portion 8.

Figure 5:
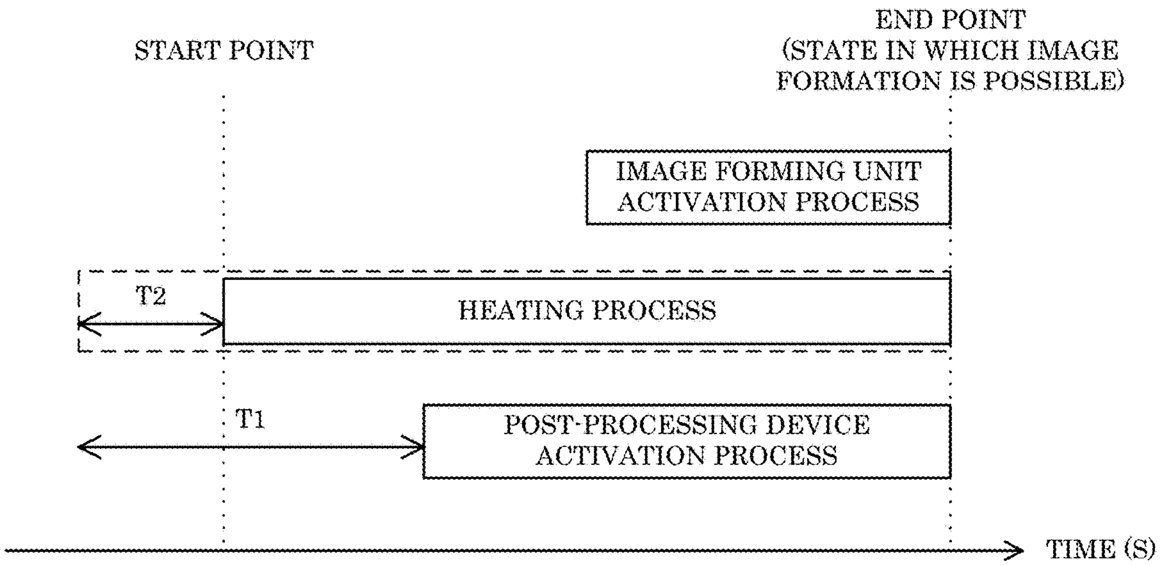
FIG. 5 shows an example of an execution schedule of a plurality of preparation processes executed in the image forming apparatus according to the embodiment of the present disclosure.

Specifically, as shown in FIG. 5, the control portion 8 determines the start timing of each of the preparation processes so that the end timings of the preparation processes coincide with each other. FIG. 5 shows an example of the execution schedule of a plurality of preparation processes when the image forming unit activation process, the heating process, and the post-processing device activation process are executed in the image forming apparatus 100. It is noted that, in FIG. 5, the execution period of the heating process before correction by the prediction processing portion 54 is indicated by a dashed line.

<Step S23>

In step S23, the control portion 8 corrects the execution time of the heating process in accordance with the length of the specific execution period (see time T1 in FIG. 5) in which the post-processing device activation process is not executed in parallel in the execution period of the heating process, which is identified based on the control result by the process of step S22. Here, the process of step S23 is executed by the prediction processing portion 54 of the control portion 8.

Specifically, the control portion 8 calculates the correction value by multiplying the length of the specific execution period, the limiting amount of the power supplied to the heater 37 by the limitation processing portion 52, and the coefficient. Then, the control portion 8 subtracts the calculated correction value from the predicted value of the execution time of the heating process acquired by the process of step S21 to correct the execution time of the heating process.

For example, as shown in FIG. 5, when the length of the specific execution period is time T1, the execution time of the heating process is shortened by time T2.

<Step S24>

In step S24, the control portion 8 corrects the start timing of the heating process based on the correction result of the execution time of the heating process by the process of step S23.

Specifically, as shown in FIG. 5, the control portion 8 corrects the start timing of the heating process so that the end timings of the preparation processes coincide with each other.

<Step S25>

In step S25, the control portion 8 executes each of the preparation processes to be executed in accordance with the start timing of each of the preparation processes determined in the processes of step S22 and step S24. Here, the process of step S25 is an example of the preparation step of the present disclosure, and is executed by the preparation processing portion 51 of the control portion 8.

<Step S15>

In step S15, the control portion 8 predicts the execution time of each of the preparation processes to be executed. Here, the process of step S15 is an example of the prediction step of the present disclosure, and is executed by the prediction processing portion 54 of the control portion 8.

Here, the control portion 8 predicts the execution time of the heating process based on the voltage value of the AC voltage acquired by the process of step S12 and the power supplied to the heater 37 limited by the limitation processing portion 52. Accordingly, since the execution time of the heating process is predicted in consideration of the limitation of the power supplied to the heater 37 due to the post-processing device activation process, the prediction accuracy of the execution time of the heating process can be improved.

<Step S16>

In step S16, the control portion 8 determines the start timing of each of the preparation processes to be executed based on the prediction result of the process of step S15. Here, the process of step S16 is executed by the timing control portion 55 of the control portion 8.

Figure 6:
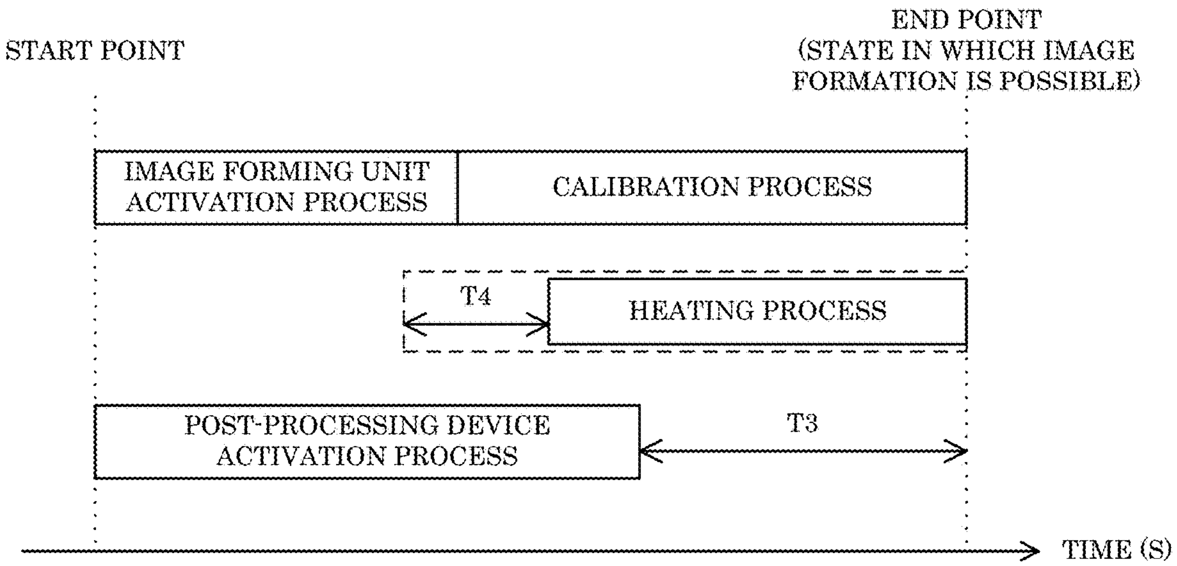
FIG. 6 shows an example of an execution schedule of a plurality of preparation processes executed in the image forming apparatus according to the embodiment of the present disclosure.

Specifically, as shown in FIG. 6, the control portion 8 determines the start timing of the post-processing device activation process so that the start timing of the post-processing device activation process coincides with the start timing of the image forming unit activation process. In addition, the control portion 8 determines the start timing of the heating process so that the end timing of the heating process coincides with the end timing of the calibration process. This makes the length of the specific execution period (see time T3 in FIG. 6) longer than when the start timing of each of the preparation processes is determined so that the end timings of the preparation processes coincide with each other. Therefore, the execution period of the heating process can be shortened. FIG. 6 shows an example of the execution schedule of a plurality of preparation processes when the heating process, the post-processing device activation process, and the image forming unit activation process and the calibration process, which are successively executed, are executed in the image forming apparatus 100. It is noted that, in FIG. 6, the execution period of the heating process before correction by the prediction processing portion 54 is indicated by a dashed line.

<Step S17>

In step S17, the control portion 8 corrects the execution time of the heating process in accordance with the length of the specific execution period (see time T3 in FIG. 6) in which the post-processing device activation process is not executed in parallel in the execution period of the heating process, which is identified based on the control result by the process of step S16. Here, the process of step S17 is executed by the prediction processing portion 54 of the control portion 8.

Specifically, the control portion 8 calculates the correction value by multiplying the length of the specific execution period, the limiting amount of the power supplied to the heater 37 by the limitation processing portion 52, and the coefficient. Then, the control portion 8 subtracts the calculated correction value from the predicted value of the execution time of the heating process acquired by the process of step S15 to correct the execution time of the heating process.

For example, as shown in FIG. 6, when the length of the specific execution period is time T3, the execution time of the heating process is shortened by time T4.

<Step S18>

In step S18, the control portion 8 corrects the start timing of the heating process based on the correction result of the execution time of the heating process by the process of step S17.

Specifically, as shown in FIG. 6, the control portion 8 corrects the start timing of the heating process so that the end timing of the heating process coincides with the end timing of the calibration process.

<Step S19>

In step S19, the control portion 8 executes each of the preparation processes to be executed in accordance with the start timing of each of the preparation processes determined in the processes of step S16 and step S18. Here, the process of step S19 is an example of the preparation step of the present disclosure, and is executed by the preparation processing portion 51 of the control portion 8.

As described above, in the image forming apparatus 100, the voltage value of the AC voltage supplied from the commercial power supply 200 is acquired, and the execution time of the heating process is predicted based on the acquired voltage value of the AC voltage. Accordingly, since the execution time of the heating process is predicted in consideration of the fluctuation of the power supplied to the heater 37, the prediction accuracy of the execution time of the heating process can be improved.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a heater configured to heat a fixing member used to fix a toner image in response to supply of an AC voltage from a commercial power supply;

a preparation processing portion configured to execute a heating process of heating the fixing member to a predetermined target temperature using the heater when the image forming apparatus transitions from a first state in which image formation is impossible to a second state in which image formation is possible;

an acquisition processing portion configured to acquire a voltage value of the AC voltage supplied from the commercial power supply; and a prediction processing portion configured to predict an execution time of the heating process based on the voltage value of the AC voltage acquired by the acquisition processing portion, wherein the preparation processing portion executes a plurality of preparation processes including the heating process when the image forming apparatus transitions from the first state to the second state, the prediction processing portion predicts an execution time of each of the preparation processes, and the image forming apparatus further comprises:

a timing control portion configured to control a start timing of each of the preparation processes executed by the preparation processing portion based on a prediction result of the prediction processing portion.

2. The image forming apparatus according to claim 1, wherein the plurality of preparation processes include a first activation process of activating an optional device, the first activation process being executed when the optional device is attached to the image forming apparatus, the image forming apparatus includes a limitation processing portion configured to limit power supplied to the heater in accordance with power consumption of the first activation process during execution of the first activation process, and the prediction processing portion predicts the execution time of the heating process based on the voltage value of the AC voltage acquired by the acquisition processing portion and the power supplied to the heater limited by the limitation processing portion when the optional device is attached to the image forming apparatus.

3. The image forming apparatus according to claim 2, wherein the prediction processing portion corrects the execution time of the heating process in accordance with a length of a specific execution period in which the first activation process is not executed in parallel in an execution period of the heating process, the specific execution period being identified based on a control result of the timing control portion, and the timing control portion corrects the start timing of the heating process based on a correction result of the execution time of the heating process by the prediction processing portion.

4. The image forming apparatus according to claim 2, wherein the plurality of preparation processes include a second activation process of activating an image forming unit configured to form the toner image, and an adjustment process of adjusting an operation condition of the image forming unit, the adjustment process being executed after the second activation process, when both of the first activation process and the adjustment process are executed, the timing control portion causes the second activation process to be executed first, controls the start timing of the first activation process based on the start timing of the second activation process, and controls the start timing of the heating process based on an end timing of the adjustment process, the prediction processing portion corrects the execution time of the heating process in accordance with a length of a specific execution period in which the first activation process is not executed in parallel in an execution period of the heating process, the specific execution period being identified based on a control result of the timing control portion, and the timing control portion corrects the start timing of the heating process based on a correction result of the execution time of the heating process by the prediction processing portion.

5. A prediction method executed in an image forming apparatus including a heater configured to heat a fixing member used to fix a toner image in response to supply of an AC voltage from a commercial power supply, the prediction method comprising:

a preparation step of executing a plurality of preparation processes when the image forming apparatus transitions from a first state in which image formation is impossible to a second state in which image formation is possible, the plurality of preparation processes including a heating process of heating the fixing member to a predetermined target temperature using the heater;

an acquisition step of acquiring a voltage value of the AC voltage supplied from the commercial power supply;

a prediction step of predicting an execution time of each of the preparation processes, including the heating process, based on the voltage value of the AC voltage acquired by the acquisition step; and a timing control step of controlling a start timing of each of the preparation processes based on the predicted execution time of each of the preparation processes.

* * * * *